United States Patent
Frankel et al.

(10) Patent No.: US 7,714,524 B2
(45) Date of Patent: May 11, 2010

(54) SYSTEM AND METHOD FOR CONTROLLING MULTIPLE DC FANS

(75) Inventors: Scott Frankel, Gilbert, AZ (US); Nigel Strike, Phoenix, AZ (US); Eric Hardt, Mesa, AZ (US); Takashi Shinano, Phoenix, AZ (US)

(73) Assignee: Minebea Co., Ltd. (JP)

( * ) Notice: Subject to any disclaimer, the term of this patent is extended or adjusted under 35 U.S.C. 154(b) by 296 days.

(21) Appl. No.: 11/958,735

(22) Filed: Dec. 18, 2007

(65) Prior Publication Data

US 2009/0154906 A1 Jun. 18, 2009

(51) Int. Cl.
*H02P 7/08* (2006.01)
*H02P 5/00* (2006.01)

(52) U.S. Cl. .............. 318/66; 318/34; 318/41; 318/266; 318/362; 417/44.1

(58) Field of Classification Search .......... 318/34, 318/41, 66, 362, 266; 700/275, 300; 417/44.1
See application file for complete search history.

(56) References Cited

U.S. PATENT DOCUMENTS

| | | | | |
|---|---|---|---|---|
| 6,185,481 | B1* | 2/2001 | Kondou et al. | 700/275 |
| 6,428,282 | B1* | 8/2002 | Langley | 417/2 |
| 6,997,684 | B2* | 2/2006 | Hahn et al. | 417/44.1 |
| 7,053,500 | B2* | 5/2006 | Furukawa et al. | 307/10.6 |
| 7,158,327 | B2* | 1/2007 | Suzuki et al. | 360/69 |
| 7,179,046 | B2* | 2/2007 | Hopkins | 415/61 |
| 7,466,086 | B2* | 12/2008 | Kiuchi et al. | 318/41 |
| 2003/0117019 | A1* | 6/2003 | Furukawa et al. | 307/10.6 |
| 2003/0175124 | A1* | 9/2003 | Hahn et al. | 417/44.1 |
| 2005/0114715 | A1* | 5/2005 | Sone | 713/300 |
| 2005/0257546 | A1* | 11/2005 | Ishishita | 62/236 |
| 2007/0013325 | A1* | 1/2007 | Kiuchi et al. | 318/34 |
| 2007/0205731 | A1* | 9/2007 | Beifus | 318/362 |
| 2008/0103635 | A1* | 5/2008 | Vuk et al. | 700/300 |

* cited by examiner

*Primary Examiner*—Paul Ip
(74) *Attorney, Agent, or Firm*—Townsend and Townsend and Crew LLP (57) ABSTRACT

A system and method for controlling multiple cooling fans is presented. The circuitry for directly driving each of the motors is removed from the motor casings, thus increasing air flow and reducing replacement costs should a motor fail. The system includes a common processor for centrally controlling the speeds of the motors and monitoring the performance of each of the multiple motors.

25 Claims, 10 Drawing Sheets

Assume: 500 Watts required to drive the motor input voltage is 24 Vdc

A, B: $V_{in}$ = 24 Vdc
$I_{in}$ = 20.8 Amps

High $I^2R$ losses in the motor winding

A, B: $V_{in}$ = 24 Vdc
$I_{in}$ = 20.8 Amps
C: $V_{in}$ = 300 Vdc
$I_{in}$ = 1.6 Amps Low $I^2R$ losses in the motor winding

SYSTEM AND METHOD FOR CONTROLLING MULTIPLE DC FANS

BACKGROUND OF THE INVENTION

The present invention relates to the control of DC motors. In particular, the present invention relates to a system and method for controlling multiple DC motors driving cooling fans.

Much electronic equipment is cooled by fans to remove heat generated by the operation of the equipment. Typically, the fans are incorporated into the chassis (referred to as a fan bank, fan panel, etc.), frame, or cabinet housing the equipment and force air through the cabinet to cool the components contained therein. For equipment that generates a lot of heat, multiple fans are used, and may be switched on or off in response to temperatures inside the frame. It is not uncommon to find a bank of six to eight fans cooling a frame. Each fan may be independently controlled by an associated temperature sensor, or a single temperature sensor may control all fans in the bank simultaneously.

Another arrangement of fan control is to vary the speed of the fans in response to the temperature sensor. Drive circuitry for variable speed fan motors, however, is typically bulky and itself generates heat that has to be removed from the frame by the airflow. Because the direct current ("DC") motors may draw substantial currents, the drive circuitry typically include, among other electronic components, a large power transistor and an associated heat sink, and a diode.

In conventional fan configurations, the drive circuitry and heat sink for the fan are mounted to the motor hub which tends to impede the airflow through the fan. For efficient airflow, the drive circuitry is required to occupy as small a volume in the hub as possible. This in turn limits the maximum power rating of the drive circuit transistors that can be used, thus limiting the power of the DC motor resulting in low efficiency airflow. For example, for 40 mm and 80 mm motors used in typical cooling fans, about a third of the volume of the motor hub is occupied by drive circuit electronics. In the prior art there are, therefore, limiting factors in the performance of the fan due to the volume occupied by the drive circuitry. An especially critical application, for example, is in rack-mounted systems such as server farms, network switches, etc., where each piece of rack-mounted equipment is restricted in height affording very little room for proper airflow.

One industry standard defines a unit of measure, called a "rack unit," for a piece of equipment as being ~44 mm (1.75 inches) in height; referred to as 1 U. The equipment can be integral multiples of 1 U in height, referred to as 2 U components, and so on. In typical rack-mounted systems, the height of the rack can be 42 U, meaning there can be 42 pieces equipment, 1 U tall, mounted into that rack. Heat generation and removal are a significant concern in such densely populated racks.

Another consideration when the drive circuitry is mounted on the motor hub is the cost of replacing a failed motor. As is known in the art, the motor may fail due to overheating of the windings or a mechanical breakdown, e.g., a damaged ball bearing assembly retaining the spindle of the motor. Because the drive circuitry is mounted on the motor hub, it is replaced along with the failed motor. Typically, the most expensive part of the fan is a microcontroller integrated circuit in the drive circuit and not the DC motor itself. Therefore, also taking the other electronic components in the drive circuit into consideration, it is much more costly to replace the motor hub assembly than it is to replace only the DC motor component.

Further, in the prior art, each of the fans operates independently of the other fans and sets its own rotational speed. There is no coordinated control of the set of fans in order to stabilize the airflow through the frame. The feedback that is established between the motor speeds and the reactions of the temperature sensor to the varying airflow caused by the independent motor speeds is not as predictable as a stable airflow caused by coordinated motor speeds.

BRIEF SUMMARY OF THE INVENTION

A system and method for controlling DC fan motors is described below to address the need for central control of the fans, and where the drive circuits for the fans are external to the fan casings. One aspect of the invention is a system for controlling multiple fans that includes a plurality of motors and a plurality of drive circuits. Each motor rotates a respective fan, and each drive circuit is electrically connected to a respective motor. The plurality of drive circuits are external to the plurality of fans. The system also includes a processor electrically connected to the plurality of drive circuits. Each drive circuit supplies current to the respective motor in response to drive signals from the processor.

Another aspect of the invention is a method for controlling multiple fans. The method includes reading a demand speed for a plurality of motors, wherein each motor rotates a respective fan. The method also includes measuring the rotational speeds of the plurality of motors and calculating the average rotational speed of the plurality of motors. The method further includes estimating the target speed of the plurality of motors. The system also determines whether the rotational speeds of the fans should be adjusted. If it is determined that adjustment is necessary, the system adjusts the rotational speed of the plurality of motors by a common drive signal to a plurality of drive circuits electrically connected to the plurality of motors. The plurality of drive circuits are external to the plurality of fans, and each drive circuit supplies current to the respective motor in response to the common drive signal.

The foregoing and other features and advantages of embodiments of the present invention will be more readily apparent from the following detailed description with reference to the accompanying drawings.

DETAILED DESCRIPTION OF THE INVENTION

The present invention has particular relevance in fans that are used to cool contemporary rack-mounted electronic equipment where its electronics are tightly packaged. For example, 1 U equipment packages its electronics within a 1.75 inch tall space. Fans for cooling such equipment are thus on the order of 1.75 inches tall. Conventional fans used in such applications incorporate the fan drive electronics within the small volume of the fan hub.

Since fans (more specifically their respective motors) are driven by electric current and high speed fan operation (which is desired for greater cooling) have high power requirements, the analog electronic components of the fan drive electronics are necessarily physically large devices in order to handle these high current flows. Such components impose a constraint on how small (e.g., diameter) the fan hub, to which the electronics are mounted, can be. This in turn imposes a limit on the area of air flow that the fan can provide. In conventional fans, the diameter of the fan hub is significantly greater than the diameter of the motor itself.

In accordance with the present invention, substantially all of the components of the drive electronics is taken off the fan hub, allowing the size of the hub to be reduced to about the size of the motor. The drive electronics is placed elsewhere in the electronic equipment being cooled, and connected to the fan by suitable cabling to deliver the drive current to the fan motor. In this way, the fan design can be optimized (e.g., reduced hub diameter) to provide maximum area for air flow, and the drive electronics can be optimized to provide the high currents needed to drive the fan at its maximum rated speed without concern for the fact that the drive circuitry will require correspondingly large electronic components (power transistors, diodes, heat sinks, etc.) to handle the high currents.

The present invention is thus especially suited for cooling fans used in 1 U equipment and in 2 U, and even in 3 U, equipment. The height of such fans ranges from about 1.75 inches (~44 mm) to about 4.25 inches (~142 mm). It is understood, however, that the present invention can be used with taller fans and is not limited to fans in the 1 U to 3 U height range.

Figure 1:
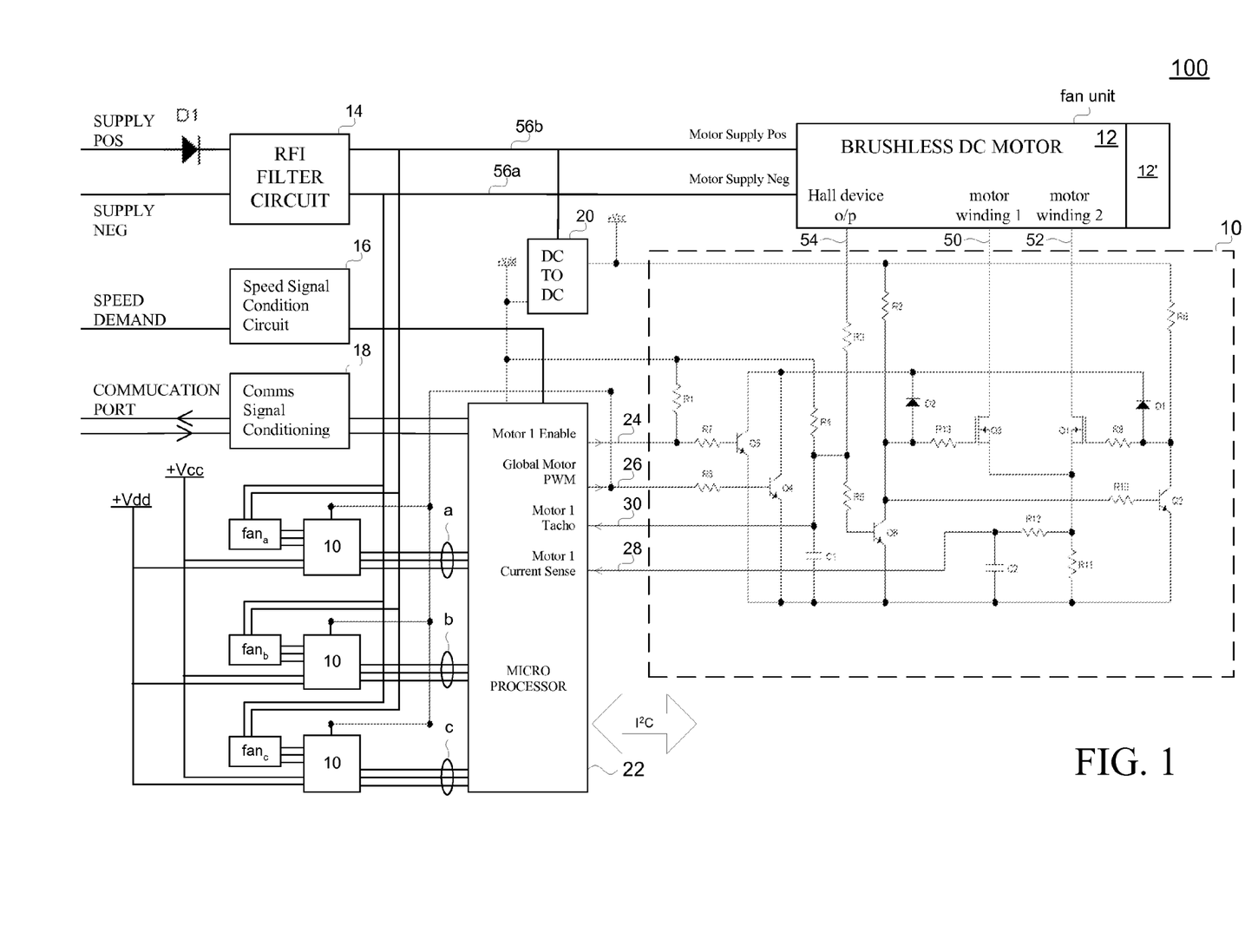
FIG. 1 is a schematic diagram illustrating an illustrative embodiment of a system for controlling multiple fans.

FIG. 1 is a schematic diagram illustrating an embodiment of a system 100 for controlling multiple fans. The system 100 includes multiple drive circuits 10 (collectively referred to as the fan driver circuitry) and multiple fan units. Each fan unit $fan_a$ to $fan_c$ includes: a housing to allow the fan unit to be mounted to the housing or frame of the equipment being cooled; a brushless DC motor 12 contained in the housing; and an impeller 12' connected to the rotor of the motor. In accordance with the present invention, is the absence in the fan unit of any of the electronic components used to produce the drive current to drive the motor 12. It is noted that typical motor designs use a Hall sensing device that must be located close enough to the rotor to detect the position of the rotor. It will be appreciated that the Hall sensing device simply provides timing information for commutation and is not considered a component used to produce drive current.

While conventionally the electronic components of the drive electronics for a fan unit are usually part of the fan assembly (e.g., assembled in the fan hub), the present invention teaches to separate these components from the fan unit, place them elsewhere in the equipment being cooled by the fan unit, and connect them to the fan unit via suitable cabling. It is understood of course that the fan unit includes a connection (e.g., a soldered connection or a pluggable connection) to which the cabling would attach, and that the connection is not considered an electronic component of the drive electronics.

FIG. 1 shows details for a representative drive circuit 10 and a corresponding fan unit. In the embodiment shown in FIG. 1 the fan control system 100 has four drive circuits 10 and four fan units 12. However, it is understood that the fan control system 100 is not limited to four such pairs and that the system may include any number of drive circuit and fan unit pairings.

Figure 3A:
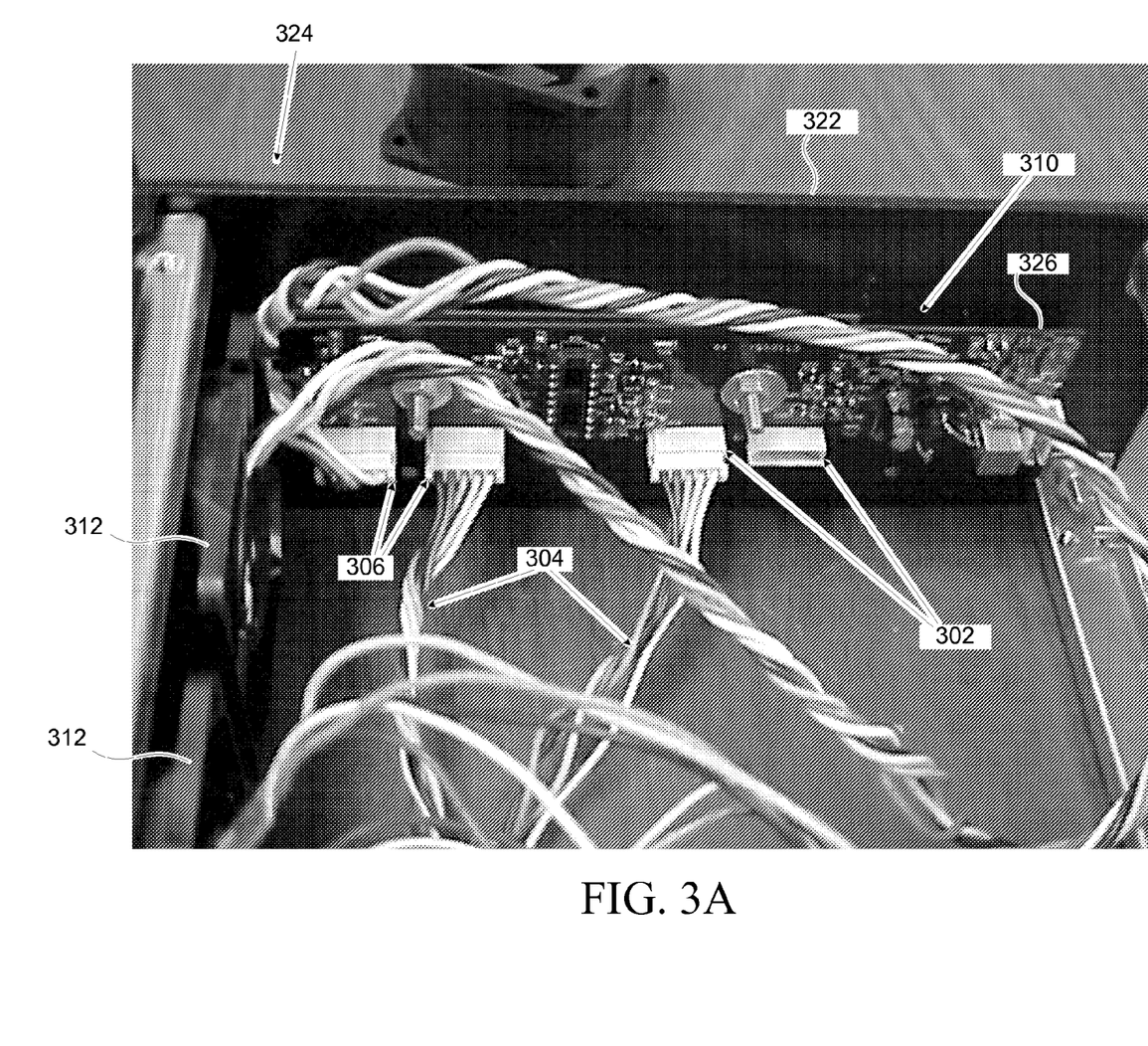
FIGS. 3A and 3B are photographs showing an implementation of the present invention in a conventional 1 U rack unit.

FIG. 3A is a photograph of a prototype of fan driver circuitry 310 according to the present invention as installed in a piece of electronic equipment 324 that is 1 U tall and which would typically be mounted into a rack. It will be understood, of course, that the present invention can be practiced with 2 U equipment (2.5 inch height) and taller. It will be further understood that the present invention can be practiced in other rack-mounted designs. In an embodiment, the fan driver circuitry 310 comprises a printed circuit board 326 on which the constituent electronic components shown in FIG. 1, such as the multiple drive circuits 10 and processor 22, are mounted and interconnected (excluding the fan units 12/12' of course). The fan driver circuitry 310 is typically mounted to a portion of the chassis 322 of the electronic equipment 324. The fan driver circuitry 310 shown in the photograph comprises four drive circuits 10 (one for each fan unit), and includes four connectors 302. Cables 304 leading from the fan units terminate at one end in a plug 306, which plugs into one of the connectors 302. In the embodiment shown in FIG. 1B, discussed below, the DC/DC converter circuit 60 can be placed on the PCB 326 along with the other electronics.

Figure 3B:
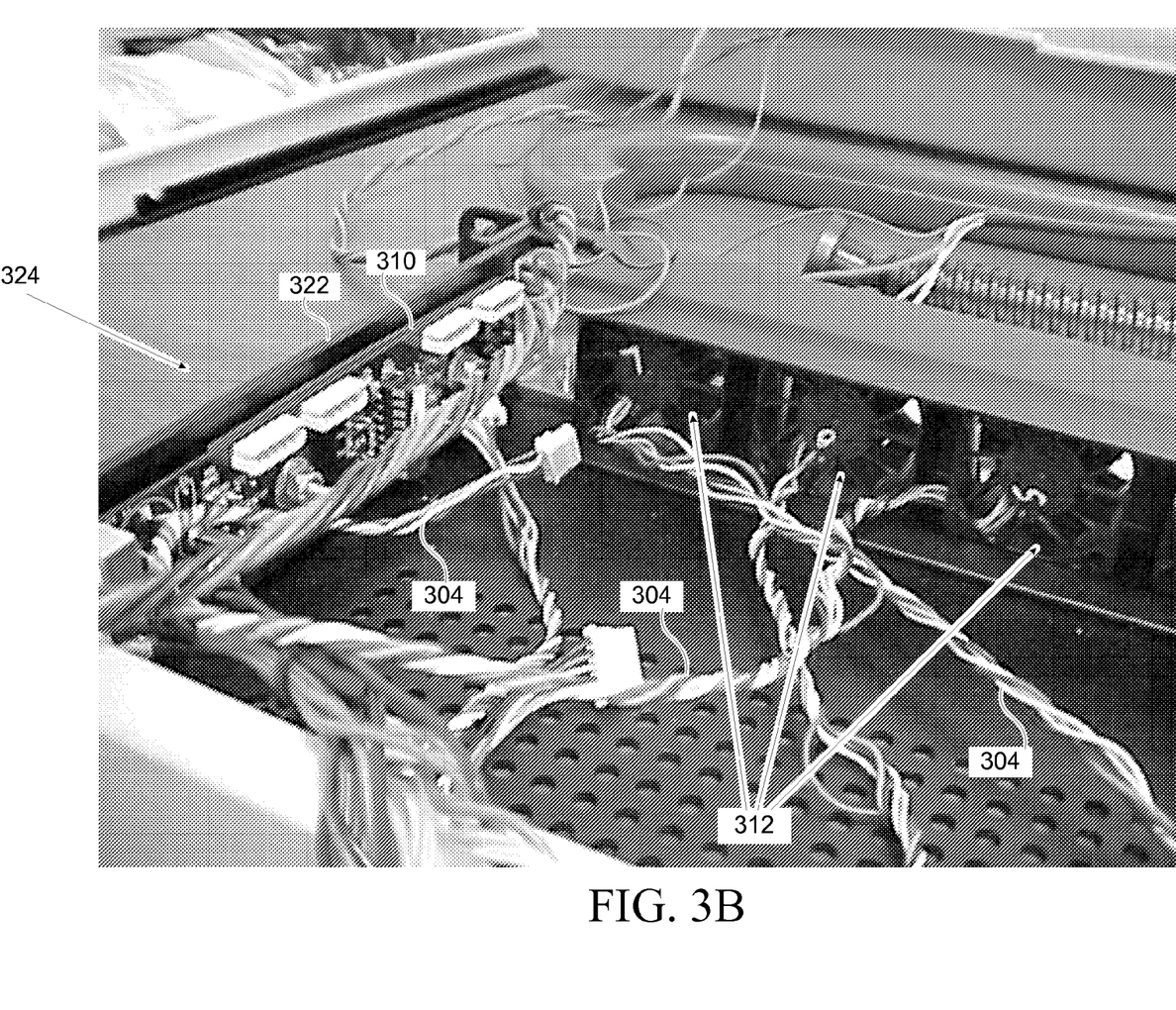

FIG. 3B is a photograph of another view of the chassis 322. The fan driver circuitry 310 and fan units 312 are shown attached to the chassis 322 of the 1 U electronic equipment 324 and are cabled together by cables 304. Typically, these enclosures house equipment that generate heat to be removed by the fan units 312.

Figure 4:
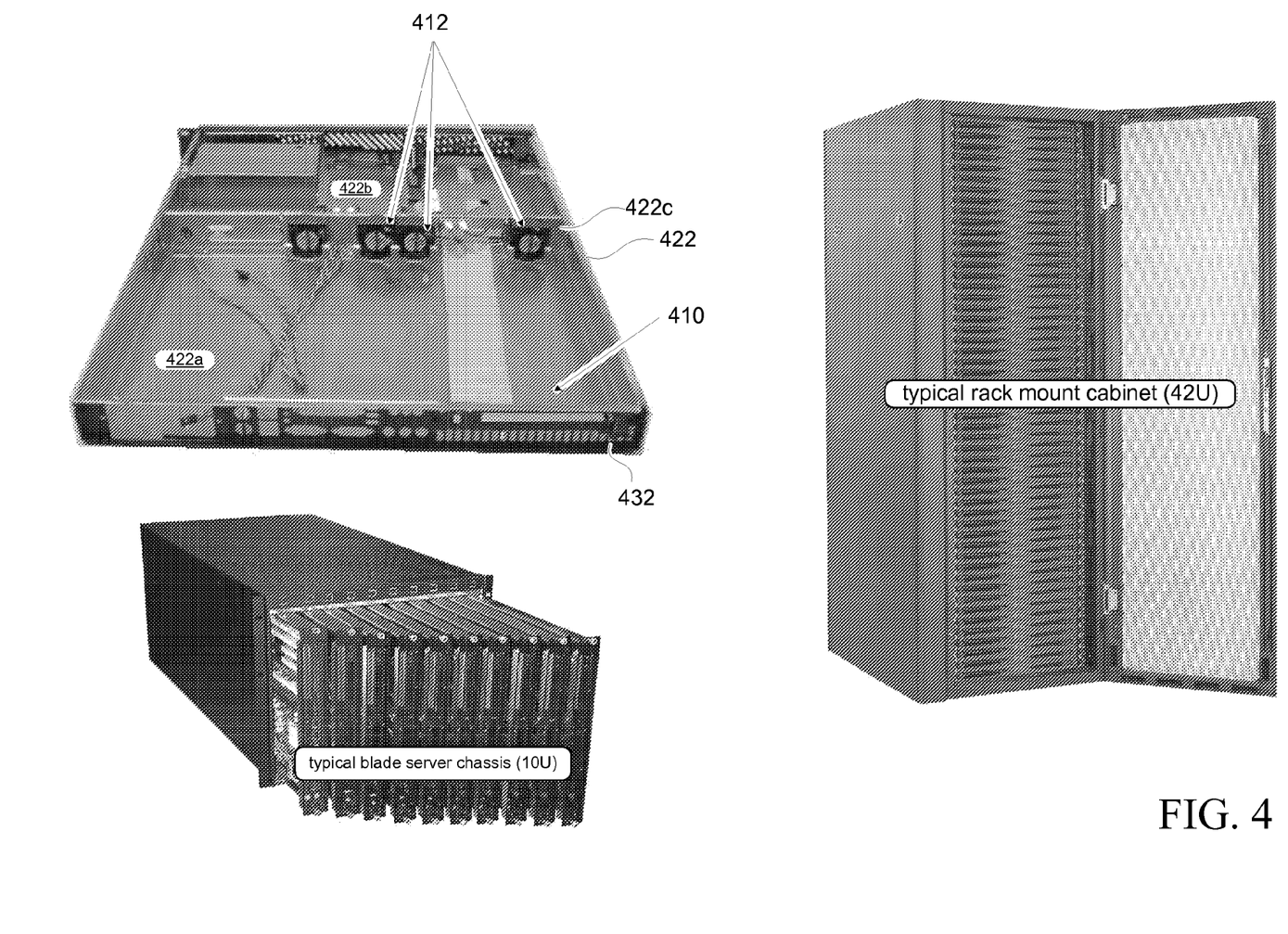
FIG. 4 is a photograph showing a perspective view of a 1 U chassis.

FIG. 4 shows a perspective view of 1 U chassis 422 provided with fan units 412 of the present invention, namely a motor and impeller but no drive electronics. In accordance with the present invention, the fan driver circuitry (e.g., 310, not shown in FIG. 4) would be mounted in the area 410 of the chassis 422. Openings on a rear panel 432 provide access to the fan driver circuitry. The chassis 422 is divided into two bays 422a, 422b for housing electronic equipment. The fan units 412 are mounted on a divider panel 422c separating the two bays 422a, 422b. The figure also shows typical enclosures (e.g., blade server chassis and rack mount cabinet) into which chassis according to the present invention, such as the 1 U chassis 422 of FIG. 4, can be inserted.

Returning to FIG. 1, included in a fan control system 100 according to the present invention is a processor 22 which controls each of the multiple drive circuits 10 and its respective motor 12. The processor 22 may be of any type programmable device familiar to those of ordinary skill in the controller arts, including but not limited to devices such as microcontrollers, general purpose CPUs, digital signal processors (DSP), dedicated logic such as application specific ICs (ASICs), gate arrays, etc., and combinations of such devices. In an embodiment, the processor 22 is a PIC16F818 microcontroller manufactured by Microchip Technology, Inc. of Chandler, Ariz.

The processor 22 may also include an Inter-IC ("I²C") interface, developed by Philips Semiconductors N.V. of Eindhoven, The Netherlands, to allow for connection to an external PC. As is familiar to those skilled in the art of microcontroller programming, an I²C interface provides for in-circuit programming of the processor 22. The processor 22 may be programmed to control a certain number of motors 12 and may need reprogramming should the number of fans in the frame be changed. Also, the processor 22 may be reprogrammed in order to add or remove monitoring of motor 12 characteristics, such as current draw or rotational speed. The I²C interface also allows for communication with customer equipment.

In an embodiment, the system includes a Radio Frequency Interference ("RFI") filter circuit 14 for rejecting any radio frequency interference appearing in the power supply that may interfere with the operation of the processor 22. Another aspect of the system is a DC to DC converter 20 that provides smooth voltage supplies at various voltage levels: $V_{cc}$ for powering the motor, and $V_{dd}$ for powering the processor 22, which may be a converter 20 of any configuration known to those of skill in the art. The RFI circuit 14 and converter 20 provide steady direct current to power both the motors 12 and the drive circuits 10.

The system also includes a speed signal conditioning circuit 16, which receives an externally provided input signal indicative of a desired speed for each of the motors 12 and converts that signal into a suitable signal that can be used by the processor 22. The processor 22 automatically controls the multiple drive circuits 10 to rotate each of the motors 12 at a steady rotational speed determined by the input signal. In an embodiment, the speed signal conditioning circuit 16 includes a buffer circuit familiar to those skilled in the art to present an analog voltage level to the processor 22 that corresponds to the desired speed in response to an analog speed demand input signal.

The system also includes a communication signal conditioning circuit 18 for allowing communication between the processor 22 and outside the fan control system. For example, an incoming communication signal may override the automatic control of the drive circuits 10 and motors 12 by switching off one of the motors, and an outgoing communication signal may provide status information for the motors 12, such as their rotational speed and how much current they are drawing. In an embodiment, the communication signal conditioning circuit 18 includes buffer circuitry and pulse shaping circuitry known to those skilled in the art.

In an alternative embodiment, the speed signal conditioning circuit 16 and/or the communication signal conditioning circuit 18 are replaced by an I²C (inter-integrated circuit) interface. In this embodiment, the speed demand signal and communication of the status and override signals are transmitted digitally through the interface to instruct the processor 22 to control the speed of the motors 12.

The processor 22 may also automatically switch on or off one or more of the motors 12 should it detect a fault in that motor 12. The processor 22 switches on or off a motor 12 by means of motor enable outputs 24, one for each motor 12. Further, each drive circuit 10 provides a tachometer signal input 30 to the processor 22. In this manner the processor 22 monitors the speed of each of the multiple motors 12. Additionally, each drive circuit 10 provides a signal representative of the current drawn by its respective motor 12. For each drive circuit 10, the processor 22 receives on a current sense line 28 a signal representative of the current drawn by the motor 12. The enable output signal 24, tachometer signal input 30, and current sense line 28 are represented as 'a', 'b', and 'c' for those drive circuits 10 that are not shown in any detail.

All of the motors 12 are controlled through their respective drive circuits 10 by a common pulse width modulated ("PWM") signal, which appears at a common output 26 and is received by each of the respective drive circuits 10. In operation, in response to a signal received at the speed signal conditioning circuit 16, the processor 22 varies the mark-to-space ratio of the PWM signal at the output 26. In turn, the drive circuit 10 is active during the "on" period of the PWM signal and supplies current to the motor 12 for this period.

In another embodiment, the microprocessor may be provided with individual outputs 26 to provide multiple PWM signals, instead of the single PWM signal in FIG. 1. Each PWM signal can be used to drive each motor 12 or groups of such motors at different speeds.

The Hall device provides a signal indicative of the rotation of the rotor. As each permanent magnet comprising the rotor passes the Hall device, a signal is produced at output 54. The Hall device output signal 54 is used to provide the timing for providing current to the windings of the motor, referred to as commutation. Though not shown in the figure, it will be understood that the signal 54 can also be processed to provide information indicative of the speed of rotation of the motor.

In one embodiment, the Hall device is integral with the motor 12. In an alternative embodiment, the Hall device is a separate component that is external to the motor 12. The signal 54 appears as output 54 of the motor 12. The signal may provide direct feedback to the drive circuit 10 to maintain a steady current through the windings of the motor 12. The signal may also provide feedback to the processor 22, which changes the PWM signal in response.

Figure 1A:
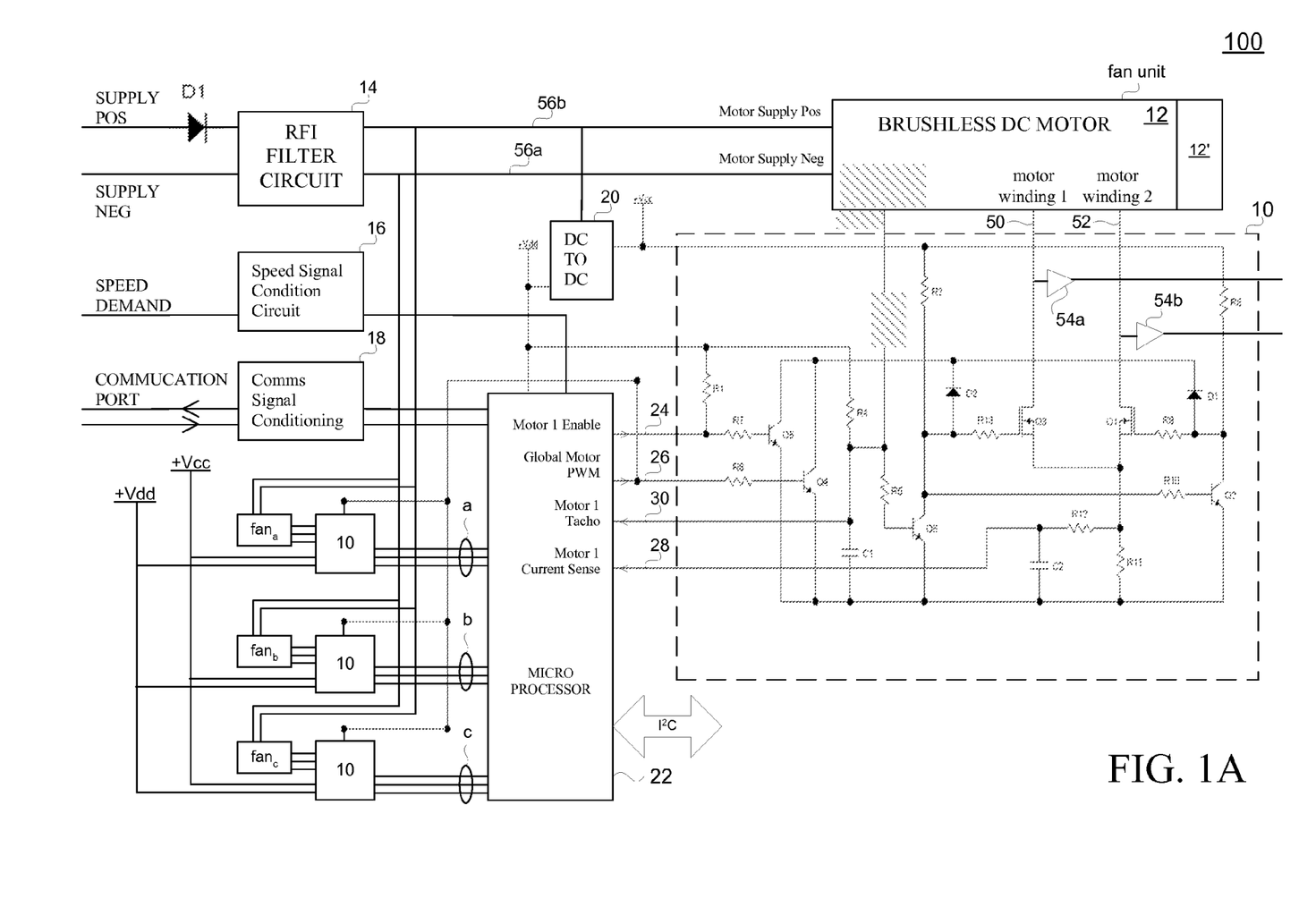
FIGS. 1A and 1B show alternate embodiments of the present invention.

Alternatives to the use of a Hall sensor device are known, and can be readily adapted in the present invention. For example, FIG. 1A shows an alternate embodiment where the Hall device and its output signal 54 are removed as indicated by the shading. In their place are circuits 54a, 54b connected to wires 50, 52 to detect the current flowing to the motor windings. The circuits 54a, 54b can be designed to detect the back EMF that is generated during commutation of the windings. Outputs of the circuits 54a, 54b can then be used to provide timing information for commutation.

The drive circuit 10 includes a half-bridge circuit to drive current through the windings of the motor 12. In an embodiment, the motor 12 is a two-phase brushless DC motor 12. The half-bridge circuit includes a drive transistor Q3 to supply current to first motor windings 50 while another drive transistor Q1 supplies current to second motor windings 52. Drive transistors Q3 and Q1 are MOSFETs in the embodiment disclosed herein and are typically rather bulky. In the fan control system 100 described herein, the drive transistors Q3 and Q1 and all other components of the system are external to the motors 12, in contrast to the prior art where the transistors, their heat sinks, and other associated components are mounted to the casing of each motor 12. In the present invention, the motors 12 need not include circuitry that takes up volume and which itself requires cooling. Additionally, should a motor 12 fail, only the fan and motor 12 need to be replaced, as opposed to replacing the motor 12 and all additional circuitry in the prior art arrangement.

The current through the first drive transistor Q3 may be controlled directly by means of a first control transistor Q6 connected to the output of the Hall device 54. Additionally, the output of the first control transistor Q6 drives a second control transistor Q2 through resistor R10, which in turn controls the current through the second drive transistor Q1.

Further, in the embodiment of FIG. 1, the current delivered to the windings 50 and 52 by the drive transistors Q3 and Q1 is switched on and off by the PWM signal generated by the processor 22. The processor 22 alters the pulses of the PWM signal in response to a demand for an increase or decrease in speed as received from the speed signal conditioning circuit 16. The common PWM signal output 26 of the processor 22 is received by a buffer transistor Q4 in the driving circuit 10 to switch on and off the drive transistors Q3 and Q1 in response to the pulses of the PWM signal.

A current monitor circuit is shown in FIG. 1 to monitor the current drawn by the motor 12 when in operation. The current monitor circuit includes the RC network comprising resistors R11 and R12, and capacitor C2. The PWM signal driving the windings 50 and 52 of the motor 12 may be directed through the RC network to be received at the current sense input 28 of the processor 22. In this manner, the processor 22 may detect if a motor 12 is faulty by drawing too much or too little current. In response, the processor 22 may determine that this particular motor 12 has failed and should be switched off while maintaining the operation of the other motors 12. To perform this switch-off, the processor 22 removes an enable signal 24 which is provided to an interface transistor Q5 in the drive circuit 10 for the failed motor 12. Removing the enable signal 24 biases the drive transistors Q3 and Q1 off and prevents current from passing through the windings 50 and 52 of the failed motor 12, thus shutting off the motor.

Further, should one of the Hall devices fail and therefore not provide an output 54 to the drive circuit 10, the processor 22 may recognize the failure from the tachometer input signal 30 presented to the processor 22. In response, the processor 22 may remove the enable signal 24 to switch off the motor 12 having the faulty Hall device.

Figure 2:
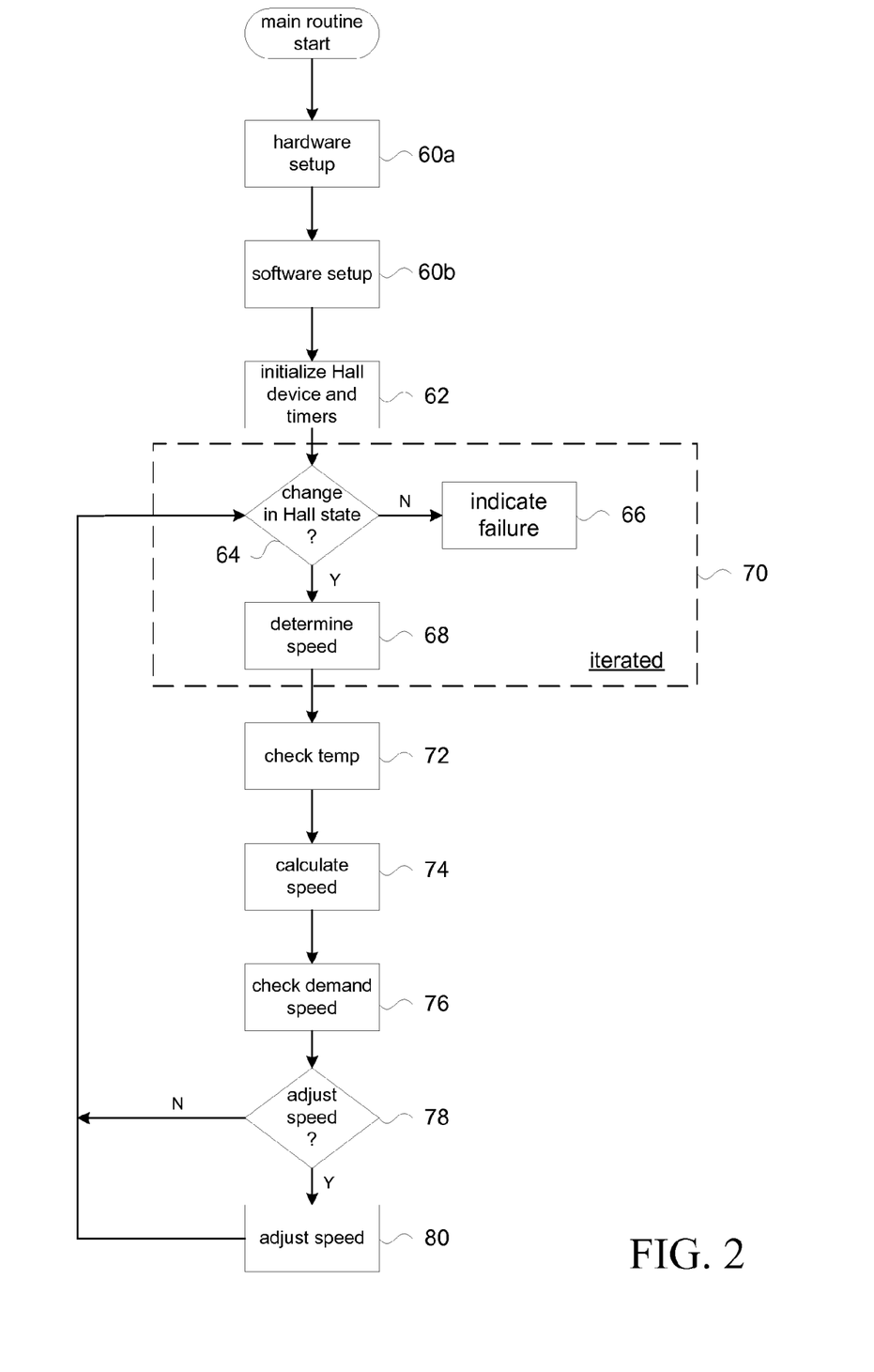
FIG. 2 is a flow diagram illustrating an illustrative method for controlling multiple DC fans.

FIG. 2 is a flow diagram illustrating a method for controlling multiple DC fans. At steps 60a and 60b, the system initializes itself. For example, the processor 22 may execute an initialization procedure, such as loading instructions for the operation of the system from a memory or executing instructions beginning at a particular step of a program. Also, the system may reset internal timers that are used to create the common PWM signal 26 and to determine the rotational speed of the motors 12 from the output 54 of the Hall devices.

The Hall device for each motor 12 is initialized at step 62. The initialization procedure involves setting timers on the processor 22 for determining the rotational speed of each motor 12 from the tachometer input signal 30. Any change in the output of the Hall device for a motor 12 is detected at step 64, and may indicate a failed motor. For example, under normal operating conditions, the frequency of the output signal of the Hall device will vary within a range. However, if the Hall output signal frequency unexpectedly drops below some threshold level or there is no signal, that condition may indicate a failing or failed motor or an obstruction in the fan which would be flagged or otherwise indicated at step 66.

In response, the processor 22 may disable this motor 12 by removing the enable signal 24 to the drive circuit 10 for the motor 12. Alternatively, if there is no change of state of the Hall device (e.g., the output signal frequency falls within some acceptable range of variation), the processor 22 stores the timer values, which may be used to determine the speed of the motor 12. Steps 64-68 are repeated 70 for each motor 12 to initialize the Hall devices of each motor 12.

At step 72, the system measures the temperature inside the equipment that is being cooled and the processor 22 determines whether the speed of the fans should be increased to circulate more air and thus reduce the temperature, or whether the speed of the fans should be decreased if the internal temperature is too low. The processor 22 calculates the target speed that the motors 12 should attain to perform the appropriate amount of cooling.

At step 74, the processor calculates the average speed of the multiple fan motors 12. The processor 22 may perform this step by determining the speed of each motor 12 from the respective tachometer input signals 30 and performing a numerical average of the speed values. Additionally, the system may change the speed of the fans in response to an interposed speed demand 16 rather than a change in temperature. At step 76 the processor 22 reads the speed demand signal from the speed signal conditioning circuit 16. The speed demand at step 76 sets the desired speed of the fans for a selected amount of cooling, while the temperature measurements at step 72 maintain this amount of cooling by adjusting the speed of the fans to compensate for temperature fluctuations.

The processor 22 determines whether the speed of the motors 12 needs to be adjusted at step 78. The processor 22 may perform this step by comparing the average speed determined at step 74 with the demand speed received at step 76. If there is no need for an adjustment of speed, the processor 22 repeats the cycle of steps 62 to 78. If an adjustment of the speed of the motors 12 is required, however, the processor 22 adjusts the common PWM signal 26 to increase or decrease the speed of the motors 12.

The configuration shown in FIG. 1 is for a unipolar motor, driven by the half-bridge circuit comprising drive transistors Q1 and Q3. It will be appreciated that other motor configurations can be used; for example, bipolar motors and multiphase motors. Three-phase motors are common multi-phase motors.

Figure 5:
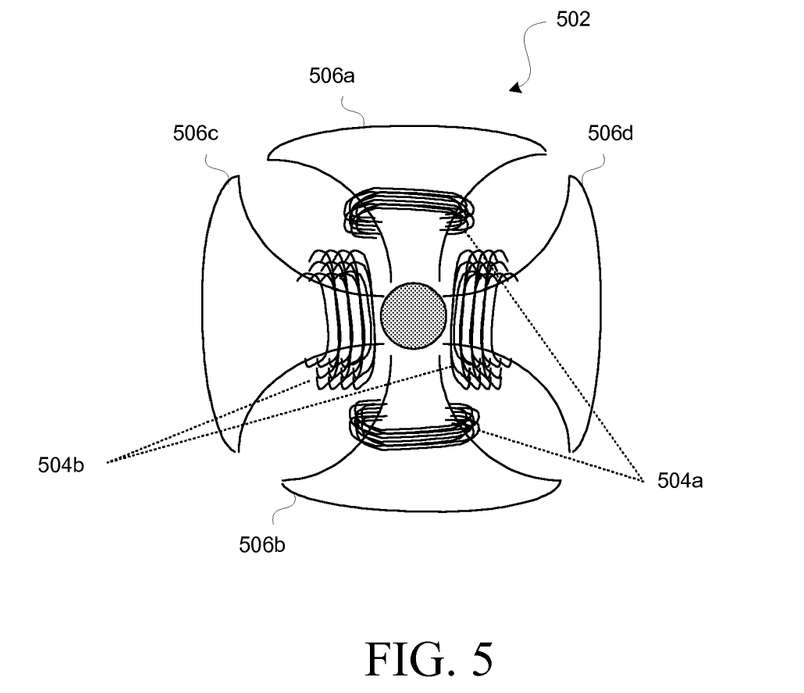
FIG. 5 is diagram used to illustrate the stator of a unipolar motor and a bipolar motor.
Figure 6:
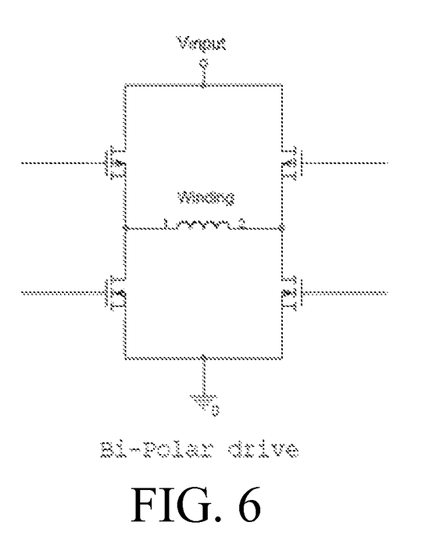
FIG. 6 illustrates a bipolar drive for driving the stator winding of a bipolar motor.

FIG. 5 shows the stator winding 502 (4 tooth, 4 slot) for both unipolar and bipolar motors. Unipolar and bipolar configurations both use a four slot stator 502 with stator windings on each of the four teeth 506a-506d. Commutation involves driving current through pairs of the stator windings in synchrony with the rotor. The drive circuit 10 shown in FIG. 1 is designed for unipolar motors. FIG. 6 shows a typical H-drive circuit for switching the drive current to the stator windings of a bipolar motor. The drive circuit 10 of FIG. 1 can be readily adapted by one of ordinary skill to replace the half-bridge circuit in FIG. 1 with the H-bridge circuit shown in FIG. 6 to drive the stator windings of a bipolar motor.

In a unipolar motor, a drive circuit such as shown in FIG. 1, two switches Q1, Q3 (FIG. 1) are used. For each half revolution of the impeller 12', each of the two switches will alternate on and off. When one of the two switches is turned on, this has the effect of energizing a magnetic field on two of the four teeth (e.g., 504a, 504b). When the other switch is turned on, the opposite two teeth (e.g., 504c, 504d) will generate a magnetic field. For a unipolar motor, the windings 504a, 504b shown in FIG. 5 represent two separate windings. One winding 504a wraps around both teeth 506a and 506b, and the other winding 504b wraps around both teeth 506c and 506d. One end of each winding is attached to a DC voltage source, the other end of each winding 50, 52 (FIG. 1) is attached to one of the two switches Q3, Q1, and then to the circuit return.

In a bipolar motor, four switches are used such as shown in FIG. 6. There is a single winding that wraps around all four stator teeth 506a-506d, but they are wound in alternating clockwise and counter-clockwise orientations. Thus, in a bipolar motor, the windings 504a, 504b shown in FIG. 5 represent two segments of a single winding. Thus, if segment 504a is wound around both teeth 506a, 506b in clockwise orientation, then segment 504b is wound in counterclockwise orientation around both teeth 506c, 506d. For each half revolution of the impeller 12', the switches shown in FIG. 6 are used such that the current is run in one direction and then switched to the other. This has the effect of energizing a magnetic field on all four stator teeth. This configuration is more efficient than the unipolar version. The drawback is there is increased cost associated with the additional two switches in the drive circuit.

Figure 7:
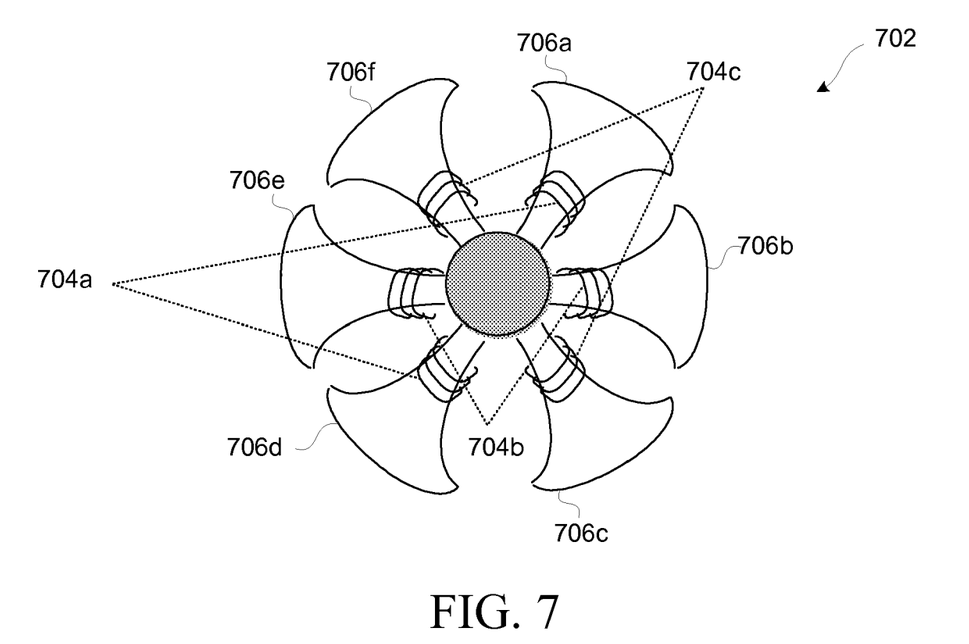
FIG. 7 shows an example of the stator of a three-phase motor.

FIG. 7 shows the stator 702 (6 tooth, 6 slot) for a three-phase motor. In a three phase stator winding configuration, three separate windings 704a-704c are used. The first winding 704a is wrapped around teeth 706a and 706d, the second winding 704b is wrapped around teeth 706b and 706e, and the third winding 704c is wrapped around teeth 706c and 706f.

Figure 8:
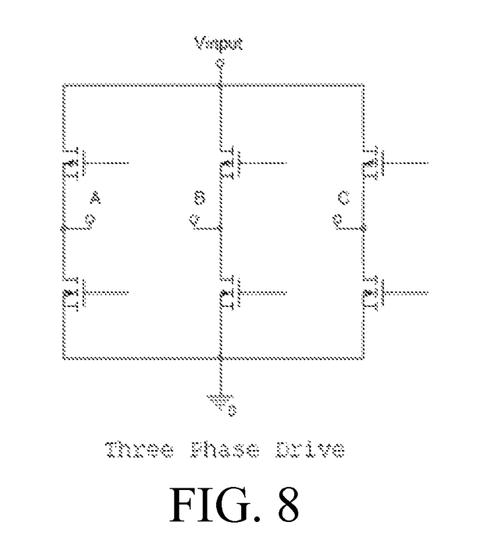
FIG. 8 illustrates a three-phase drive for driving the stator windings of FIG. 7.

FIG. 8 shows a drive current switching circuit typically used to provide drive current to the stator windings 704a-704c. The drive circuit uses three switches to switch the current. The drive circuit 10 can be readily adapted to include the drive current switching circuit shown in FIG. 8 to drive the stator windings 704a-704c. The ends of the wires wound around teeth 706d, 706e, and 706f are tied together, and the wires from teeth 706a, 706b, and 706c are attached to the switches of FIG. 8. By varying the turn on and turn off of these six switches, the teeth are energized according to a set pattern to cause the impeller to rotate. This configuration is more efficient than the unipolar and bipolar types, but is also more expensive than both.

It will be appreciated that four-phase and in general n-phase motors can be used in accordance with the present invention. However, increasing the number of stators and switches offers incremental improvements in efficiency, but at a cost of increased winding complexity.

Figure 9:
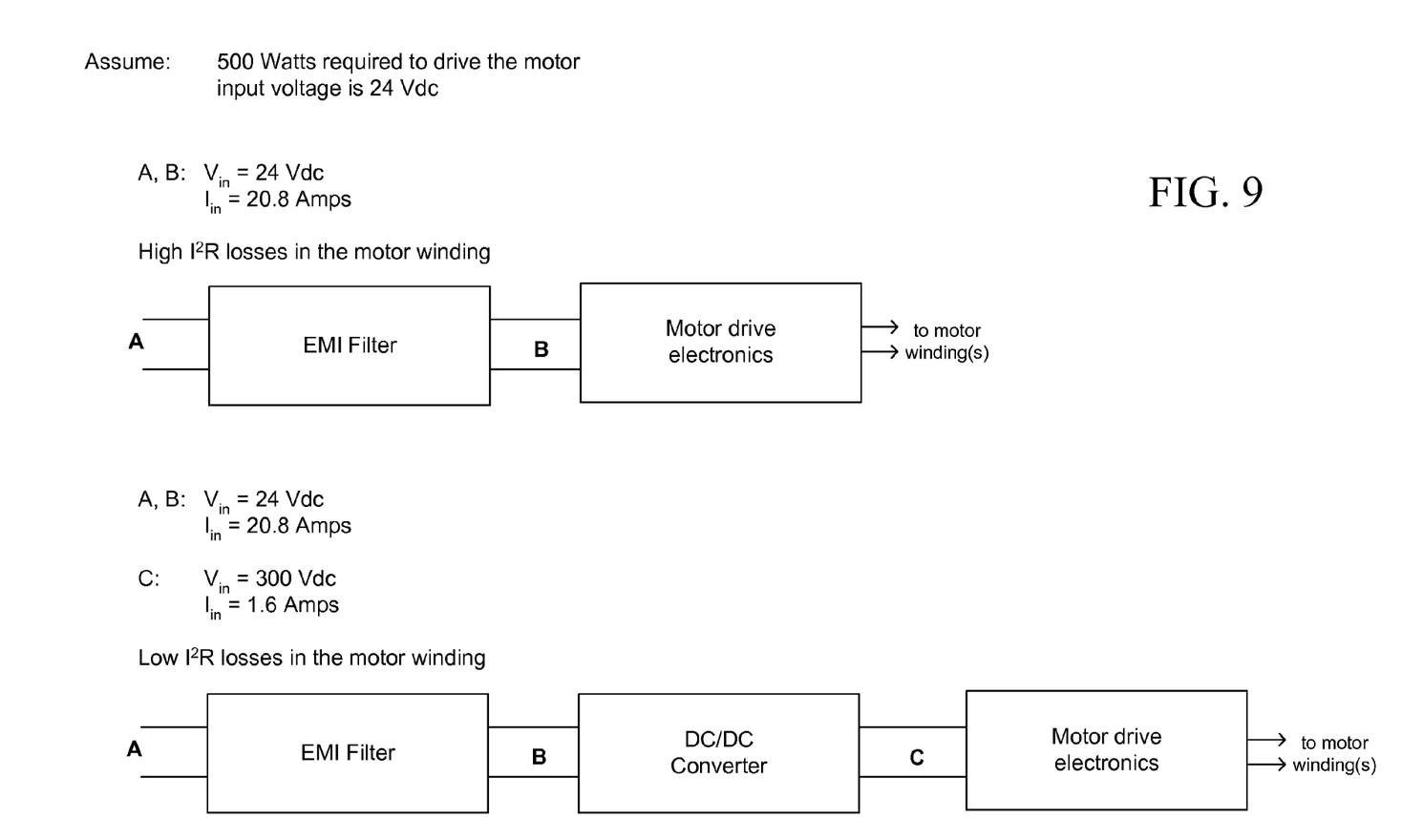
FIG. 9 illustrates another aspect of the present invention.
Figure 10:
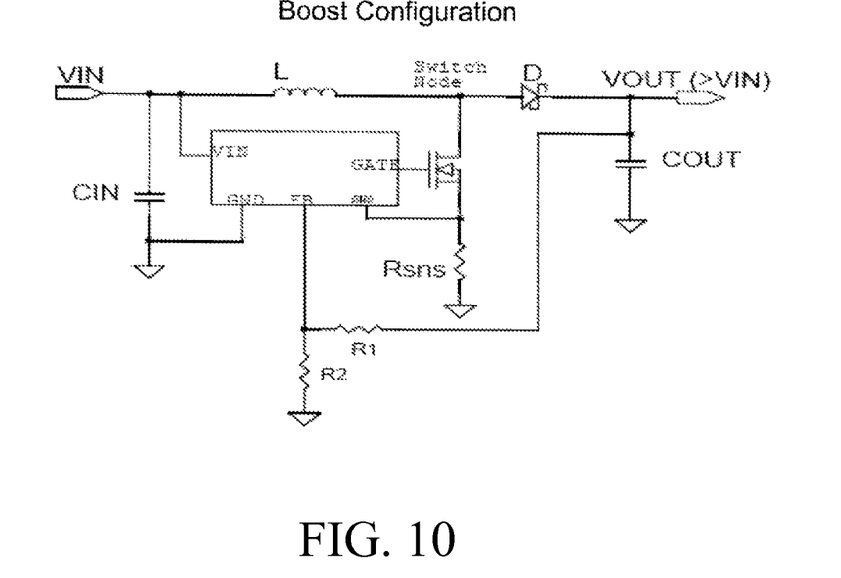
FIG. 10 is an illustrative circuit of an aspect of the present invention discussed in connection with FIG. 9.

Referring to FIG. 9, another aspect of the present invention is illustrated. Conventional motor drive circuits provide a drive voltage directly to the motor. FIG. 9 shows an example for a 500 Watt-rated motor. An electromagnetic interference (EMI) filter is typically used to filter out high-frequency noise from the voltage source. Conventional drive electronics receive the drive voltage and output a suitable pulse-width modulated (PWM) signal that is then fed to the motor winding(s). If the drive voltage at input A is 24 V DC, then conventional motor drive electronics will receive a filtered 24V DC level from the EMI filter and output a suitable PWM signal comprising 24V pulses that is coupled to the motor winding(s). A 500 Watt motor driven by 24V will draw 20.8 Amps of current. The motor winding will dissipate $I^2R$ watts of power, where I=20.8.

The bottom portion of FIG. 9 illustrates an embodiment of an aspect of the present invention. A DC/DC converter is provided to step up the voltage level, for example to 300V DC. Thus, in accordance with this aspect of the present invention, the input drive voltage of 24V DC is input at A to the EMI filter. At B, the filtered DC voltage (also at 24V DC) is stepped up by the DC/DC converter to a much higher voltage level; in the example, 300V DC. The drive electronics is fed the 300V level and produces 300V PWM pulses, which are then fed to the motor winding. The 500 Watt motor will draw 1.6 Amps of current. Clearly, the $I^2R$ loss of the motor driven by 300V pulses is much lower than driving the motor with 24V pulses.

Figure 1B:
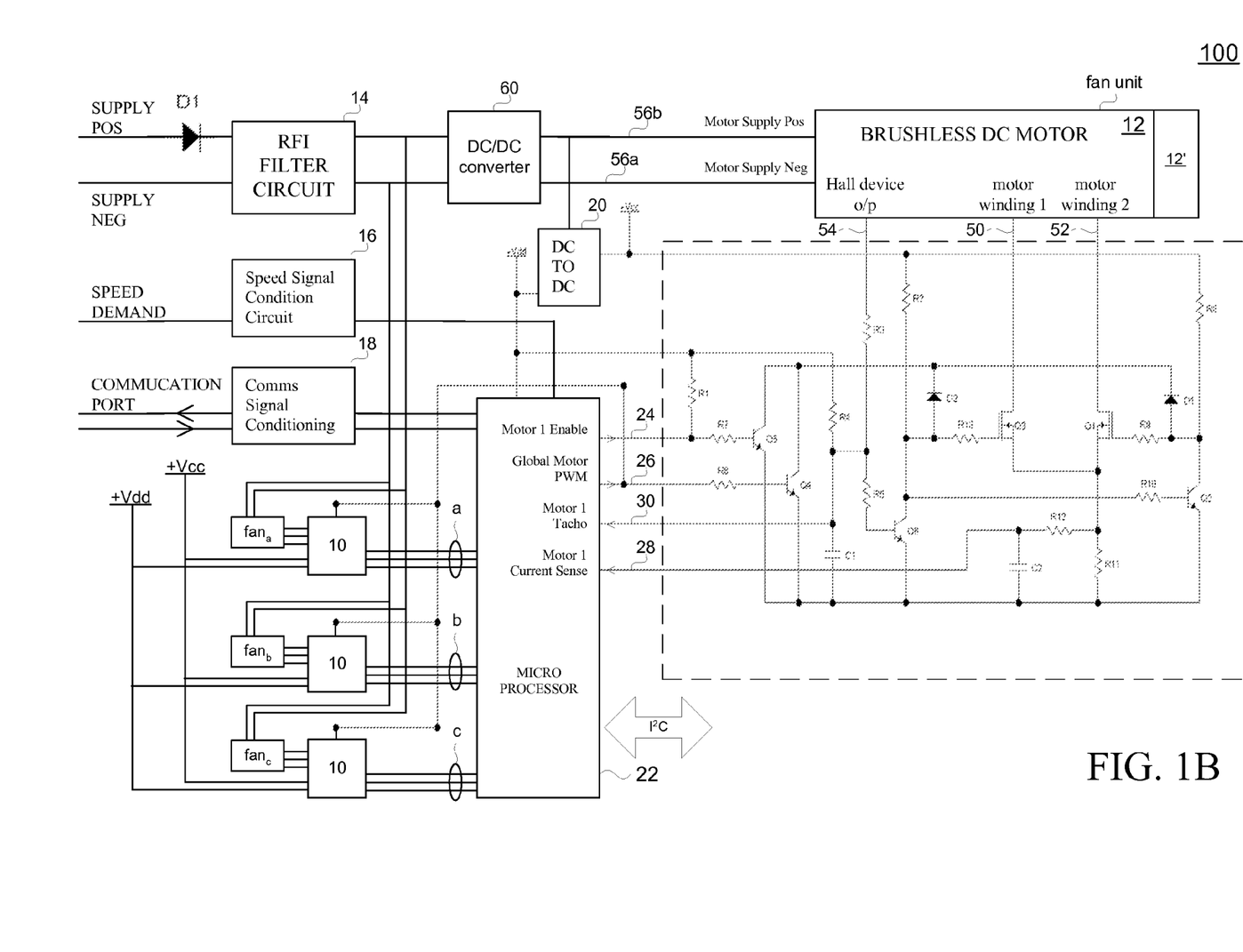

FIG. 1B shows an embodiment of the present invention that incorporates this additional aspect of the present invention. The figures shows a DC/DC converter 60 that is used to step up the voltage level coming out of the RFI filter 14. A typical step up is to the 300V level. The present invention is especially well-suited to accommodate this additional aspect of the invention shown in FIG. 9. Electronic components for handling high voltages are typically quite large and bulky and consume much space. By providing circuitry that is off-board from the motor, allows for such large components.

Although the invention described herein is with reference to particular embodiments, it should be understood that these embodiments are merely illustrative of the principals and application of the present invention. It should therefore be understood that modifications may be made to the exemplary embodiments described herein, and that other arrangements may be devised without departing from the spirit and scope of the present invention as defined by the following claims.

What is claimed is:

1. A fan drive system comprising:
  a plurality of motors, wherein each motor rotates a respective fan among a plurality of fans;
  a plurality of drive circuits, wherein each drive circuit is external to a fan hub of a respective fan and is electrically connected to a respective motor, wherein said each drive circuit is disposed at a location different from the location of the fan hub of the respective fan and the respective motor; and
  a processor electrically connected to the plurality of drive circuits, wherein said each drive circuit produces a current in response to drive signals from the processor, wherein the current produced by said each drive circuit is supplied to the respective motor.

2. The system of claim 1 further comprising a position sensor associated with each of the motors, each position sensor providing a sensor signal that varies with rotation of the motor associated therewith, wherein the current is supplied to the motor based on the sensor signal.

3. The system of claim 2 wherein said each position sensor is a Hall device.

4. The system of claim 1 wherein drive circuits are disposed at a first location in an equipment chassis and the motors are disposed at a second location in the equipment chassis different from the first location.

5. The system of claim 4 wherein the equipment chassis is 3 U or less in height.

6. The system of claim 2 wherein said each position sensor is configured to detect back EMF (electromotive force) in windings of the motor, where the sensor signal provided by said each position sensor is based detected back EMF (electromotive force).

7. The system of claim 2 wherein the processor enables or disables a drive circuit of a respective motor based on the sensor signal.

8. The system of claim 1 wherein the processor provides a respective enable signal to said each drive circuit, wherein said each drive circuit supplies current to the motor in response to the enable signal from the processor.

9. The system of claim 8 wherein the plurality of drive circuits monitor the current to the respective motor, wherein the processor removes an enable signal to the drive circuit of a respective failed motor in response to an overdrawn current.

10. The system of claim 1 wherein the current produced by said each drive circuit is supplied to windings of the respective motor.

11. The system of claim 1 wherein the processor includes an $I^2C$ interface.

12. The system of claim 1 wherein the motor is a brushless DC (direct current) motor.

13. The system of claim 1 further comprising a DC/DC converter to step up an input DC voltage to a stepped-up voltage level that is higher than the input DC voltage, the stepped-up voltage level being coupled to the drive circuit.

14. A method for operating a plurality of fans, comprising:
  reading one or demand speeds for a plurality of motors, wherein each motor rotates a respective fan, the motors and their respective fans being disposed at a first location;
  producing a plurality of drive currents based at least on the one or more demand speeds, the drive currents being produced in electronic components that are external to fan hubs of their respective fans located at a second location that is different from the first location; and providing the drive currents to respective windings of the motors via cabling connecting the electronic components to the respective windings.

15. The system of claim 14 further comprising detecting respective rotor positions of the motors and providing information relating to the respective rotor positions to the electronic components.

16. The system of claim 15 wherein the detecting is performed by respective Hall sensing devices disposed proximate the motors, wherein the step of providing information includes sending signals generated by the respective Hall devices via the cabling.

17. The system of claim 15 wherein the detecting includes sensing the drive currents for occurrences of back EMF.

18. The system of claim 14 wherein the producing includes providing respective rotor position information of the motors to a data processing unit, the data processing unit outputting one or control signals, wherein the electronic components produce the drive currents in response to the one or more control signals.

19. The system of claim 18 further including programming the data processing unit via an I$^2$C interface.

20. A system for controlling a plurality of fans, comprising:
means for reading a demand speed for a plurality of motors, wherein each motor rotates a respective fan;
means for measuring the rotational speeds of the plurality of motors;
means for calculating the average rotational speed of the plurality of motors;
means for estimating the target speed of the plurality of motors;
means for determining whether the rotational speeds of the fans should be adjusted; and
means for adjusting the rotational speed of the plurality of motors by a common drive signal to a plurality of drive circuits electrically connected to the plurality of motors, when the rotational speeds of the fans should be adjusted,
wherein the plurality of drive circuits are separate from the motors and the respective fans, and wherein each drive circuit supplies current to the motors in response to the common drive signal.

21. The system of claim 20 wherein the plurality of drive circuits are disposed at a first location in an electronic equipment chassis and the motors and respective fans are disposed at a second location in the electronic equipment chassis other than the first location.

22. The system of claim 21 wherein the equipment chassis is 3 U or less in height.

23. The system of claim 20 wherein the means for measuring the rotational speed includes a Hall sensor device.

24. The system of claim 20 wherein the means for measuring the rotational speed includes means for sensing back EMF in the drive currents.

25. A fan drive system comprising:
a plurality of motors, wherein each motor rotates a respective fan among a plurality of fans;
a plurality of drive circuits, wherein each drive circuit is external to a fan hub of a respective fan and is electrically connected to a respective motor, wherein said each drive circuit is disposed at a location different from the location of the fan hub of the respective fan and the respective motor;
a processor electrically connected to the plurality of drive circuits, wherein said each drive circuit produces a current in response to drive signals from the processor, wherein the current produced by said each drive circuit is supplied to the respective motor;
an input circuit for receiving an input DC voltage; and
a DC-to-DC converter to receive the input DC voltage from the input circuit and to produce a stepped-up voltage having a DC level higher than that of the input DC voltage;
said each drive circuit receiving the stepped-up voltage, the current in said each drive circuit being produced from the stepped-up voltage.

* * * * *